No. 703,272. Patented June 24, 1902.
G. JOHNSON, Jr.
CUTTER HEAD.
(Application filed Oct. 27, 1900.)
(No Model.)
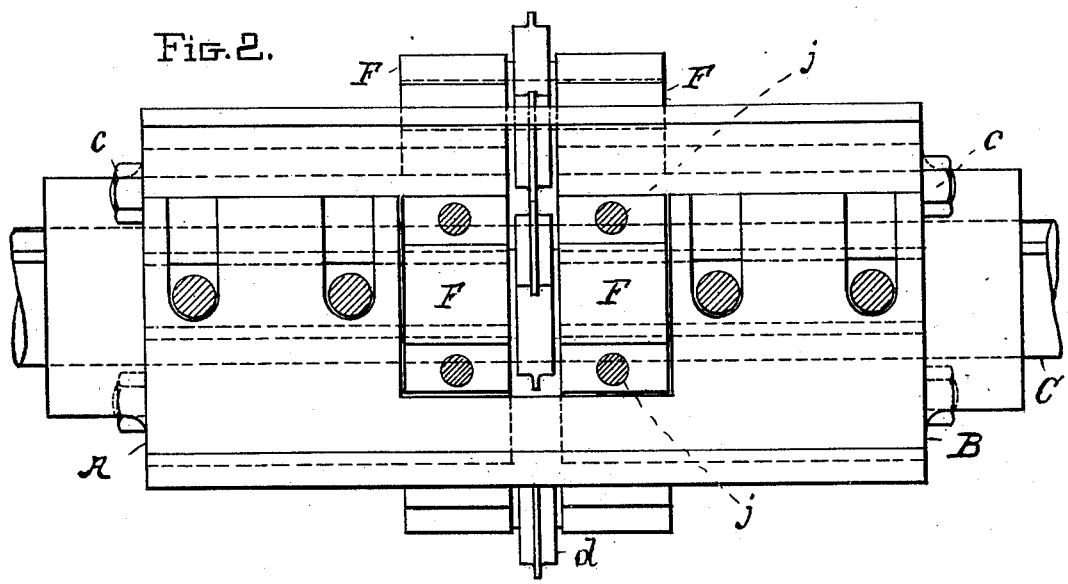
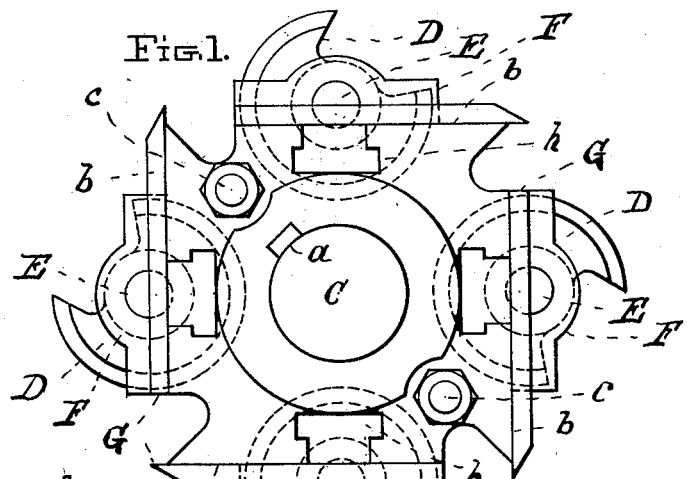
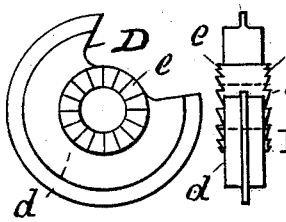
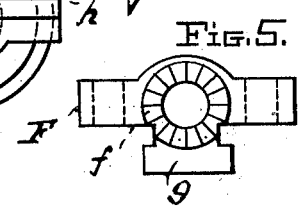
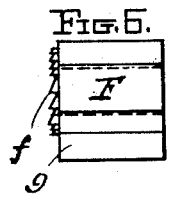
WITNESSES:— INVENTOR:—

UNITED STATES PATENT OFFICE.

GREENLEAF JOHNSON, JR., OF BALTIMORE, MARYLAND.

CUTTER-HEAD.

SPECIFICATION forming part of Letters Patent No. 703,272, dated June 24, 1902.

Application filed October 27, 1900. Serial No. 34,559. (No model.)

*To all whom it may concern:*

Be it known that I, GREENLEAF JOHNSON, Jr., of the city of Baltimore and State of Maryland, have invented certain Improvements in Cutter-Heads for Wood-Planing Machines, of which the following is a specification.

This invention relates to certain improvements in a cutter-head especially adapted to hold circular or disk cutters, such as are generally used in cutter-heads for channeling purposes, whether alone or in connection with flat-blade cutters of the description usually employed for surfacing boards.

In the further description of the said invention which follows reference is made to the accompanying drawings, forming a part hereof, and in which—

Figure 1 is an exterior end view of the improved cutter-head, together with its shaft and cutters or knives. Fig. 2 is a view of Fig. 1 as seen from the top. Figs. 3 and 4 are respectively an enlarged side and an enlarged end edge view of a circular or disk cutter especially constructed for application to the improved head. Figs. 5 and 6 are respectively an enlarged side and an enlarged end view of a detachable part of the cutter-head.

Referring now to the drawings, A and B are the two main members of the cutter-head, which consist of blocks adapted to slide on a feather $a$ on the shaft C. The blocks A and B have preferably four faces or sides $b$, (see Fig. 1,) and they are drawn together by means of the bolts $c$, which pass entirely through the head.

D D are the circular or disk cutters, (see Figs. 3 and 4,) which are of ordinary description, except that the faces of their hubs $d$ are provided with the teeth $e$. The cutters D are placed between the members A and B of the head and held accurately in position by means of shafts E, the ends of which rest in bearings F, having their inner faces provided with teeth $f$, which mesh with those on the faces of the hubs of the cutters. It will be understood that when the bolts $c$ are drawn tightly the teeth of the bearings and those of the cutters are securely interlocked, and the cutters cannot move in any direction. The bearings F have T projections $g$, which rest in slots $h$ in the head, and the bolts which hold the bearings in place are shown only in section and marked $j$ in Fig. 2.

G G are ordinary flat-surfacing cutters secured in the usual manner to the faces of the head. These cutters form no part of the present invention.

I claim as my invention—

A cutter-head for a wood-planing machine, in two parts or sections adapted to rest side by side on a single shaft with means to draw the two sections together, combined with circular cutters situated between the two sections of the cutter-head having teeth on their hubs, shafts for sustaining the cutters, and bearings for the said shafts having teeth on the faces adjoining the cutters adapted to interlock with those on the hubs of the cutters, substantially as specified.

GREENLEAF JOHNSON, JR.

Witnesses:
GEO. E. TAYLOR,
WM. T. HOWARD.